(12) United States Patent
Fukami et al.

(10) Patent No.: US 8,448,430 B2
(45) Date of Patent: May 28, 2013

(54) THRUST ROLLER BEARING AND TORQUE CONVERTER

(75) Inventors: Rino Fukami, Iwata (JP); Kazuyuki Yamamoto, Hamamatsu (JP); Katsufumi Abe, Iwata (JP)

(73) Assignee: NTN Corporation, Osaka (JP)

( * ) Notice: Subject to any disclaimer, the term of this patent is extended or adjusted under 35 U.S.C. 154(b) by 886 days.

(21) Appl. No.: 12/448,975

(22) PCT Filed: Dec. 20, 2007

(86) PCT No.: PCT/JP2007/074529
§ 371 (c)(1),
(2), (4) Date: Jul. 17, 2009

(87) PCT Pub. No.: WO2008/090703
PCT Pub. Date: Jul. 31, 2008

(65) Prior Publication Data
US 2010/0058750 A1 Mar. 11, 2010

(30) Foreign Application Priority Data

Jan. 24, 2007 (JP) ................................. 2007-014188
Jan. 24, 2007 (JP) ................................. 2007-014189
Jan. 24, 2007 (JP) ................................. 2007-014190

(51) Int. Cl.
*F16D 33/00* (2006.01)
*F16C 33/46* (2006.01)

(52) U.S. Cl.
USPC ............................................ 60/361; 384/621

(58) Field of Classification Search
USPC ................. 384/420, 590, 618, 620, 621, 622, 384/623; 29/898; 60/361
See application file for complete search history.

(56) References Cited

U.S. PATENT DOCUMENTS

| | | | | |
|---|---|---|---|---|
| 3,913,994 A | * | 10/1975 | Alling et al. | 384/623 |
| 3,994,546 A | * | 11/1976 | Alling | 384/623 |
| 7,273,319 B2 | * | 9/2007 | Tamada et al. | 384/623 |
| 2003/0165281 A1 | * | 9/2003 | Fujioka et al. | 384/618 |
| 2004/0091193 A1 | * | 5/2004 | Obayashi et al. | 384/623 |
| 2004/0146233 A1 | * | 7/2004 | Lynch et al. | 384/621 |
| 2006/0023986 A1 | * | 2/2006 | Chihara | 384/621 |

FOREIGN PATENT DOCUMENTS

| | | |
|---|---|---|
| CN | 1390283 | 1/2003 |
| JP | 9-137824 | 5/1997 |
| JP | 9-189325 | 7/1997 |
| JP | 2000-266043 | 9/2000 |

(Continued)

*Primary Examiner* — Edward Look
*Assistant Examiner* — Logan Kraft
(74) *Attorney, Agent, or Firm* — Clark & Brody

(57) ABSTRACT

A thrust roller bearing includes a plurality of rollers, a retainer, an annular first track ring having a track surface, an outer periphery flange part, and a first claw part, and an annular second track ring having a track surface, an inner periphery flange part, and a second claw part. Bearing internal gaps to allow the eccentric rotation of the first track ring and the second track ring are provided between the outer periphery flange part and an outer edge part of the retainer, and between the inner periphery flange part and an inner edge part of the retainer. In addition, at least one of the first and second claw parts is a projection part formed by a bending process. Furthermore, an edge part of the retainer opposed to the projection part has a first slope part formed at a corner part on the side opposed to the track surface, and a second slope part having a radial length relatively shorter than that of the first slope part, and formed at a corner part on the opposite side in a thickness direction.

10 Claims, 12 Drawing Sheets

FOREIGN PATENT DOCUMENTS

| JP | 2002-115722 | 4/2002 |
| JP | 2003-83339 | 3/2003 |
| JP | 2003-254327 | 9/2003 |
| JP | 2004-176781 | 6/2004 |
| JP | 2004-190778 | 7/2004 |
| JP | 2005-344799 | 12/2005 |
| JP | 2006-125427 | 5/2006 |
| JP | 2006-200724 | 8/2006 |

* cited by examiner

US 8,448,430 B2

THRUST ROLLER BEARING AND TORQUE CONVERTER

TECHNICAL FIELD

The present invention relates to a thrust roller bearing and more particularly, to a thrust roller bearing used in circumstances where eccentric rotation is generated such as in a torque converter.

BACKGROUND ART

A conventional thrust roller bearing 101 is disclosed in Japanese Unexamined Patent Publication No. 2003-83339, for example. Referring to FIG. 29, the thrust roller bearing 101 disclosed in the above document includes a plurality of rollers 102, a retainer 103 to retain the plurality of rollers 102, and first and second track rings 104 and 105 to sandwich the rollers 102 in a thickness direction.

The first track ring 104 has a track surface 104a formed on one side of a wall surface of an annular member in a thickness direction so as to be in contact with a roller 102, a cylindrical flange part 104b extending from an outer edge part of the annular member toward the side of the track surface 104a, and a plurality of projection parts 104c projecting from a tip end of the flange part 104b toward a radial inner side to hold the retainer 103.

Similarly, the second track ring 105 has a track surface 105a formed on one side of a wall surface of an annular member in a thickness direction so as to be in contact with the roller 102, a cylindrical flange part 105b extending from an inner edge part of the annular member toward the track surface 105a, and a plurality of projection parts 105c projecting from a tip end of the flange part 105b toward a radial outer side to hold the retainer 103.

According to the thrust roller bearing 101, an inner diameter dimension of the flange part 104b is set so as to be larger than an outer diameter dimension of the retainer 103, and a radial bearing internal gap is provided between the retainer 103 and the flange part 104b. Thus, according to the above document, even when the thrust roller bearing 101 is used in circumstances such as a torque converter in which eccentric rotation is generated, heat generation and abrasion due to friction between the retainer 103 and the flange part 104b can be effectively prevented.

Here, as the bearing internal gap is provided, the retainer 103 and the track ring 104 could be separated. For example, they could be separated in the case where the track rings 104a and 105b are transported in a vertical state. Thus, according to the thrust roller bearing 101 disclosed in the above document, a diameter of a circle formed by tip ends of the projection parts 104c is set so as to be smaller than the outer diameter dimension of the retainer 103. Thus, it is reported that the separation between the retainer 103 and the track ring 104 can be prevented. This is applied to the case where the retainer 103 is incorporated in the second track ring 105.

In addition, similar thrust roller bearings are also disclosed in Japanese Unexamined Patent Publication No. 9-137824, Japanese Unexamined Patent Publication No. 9-189325, Japanese Unexamined Patent Publication No. 2000-266043, and Japanese Unexamined Patent Publication No. 2003-254327.

However, as the projection amount of the projection part 104c is increased, assembling properties of the thrust roller bearing 101 deteriorate. More specifically, the retainer 103 and the projection part 104c have to be largely elastically-deformed when going through the projection 104c. This could cause the deformation of the retainer 103 and the damage of the projection part 104.

As one method to solve this problem, the projection part 104c is subjected to an anti-carburizing process so as not to be affected by quenching, or it is subjected to a partial tempering process after a quenching process. However, while the retainer 103 can be easily incorporated due to the above processes, the strength of the projection part 104c is lowered.

In addition, as an alternative method, the thrust roller bearing 101 is subjected to a heat treatment as a whole after the rollers 102 and the retainer 103 have been incorporated in the track ring 104. However, each of the retainer 103 and the track ring 104 is deformed in some cases, which could cause the rotation defect of the thrust roller bearing 101.

DISCLOSURE OF THE INVENTION

It is an object of the present invention to provide a thrust roller bearing which is used in circumstances where eccentric rotation is generated, such as a torque converter, and in which a retainer and a track ring are effectively prevented from being separated without deteriorating assembling properties between the retainer and the track ring.

In addition, it is another object of the present invention to provide a highly-reliable torque converter by using the above thrust roller bearing.

A thrust roller bearing according to the present invention includes a plurality of rollers, a retainer to retain the plurality of rollers, an annular first track ring having a track surface on which the roller rolls, a cylindrical outer periphery flange part axially extending from an outer periphery end of the track surface, and a first claw part projecting from a tip end of the outer periphery flange part toward the inner diameter side to limit the axial movement of the retainer, and an annular second track ring having a track surface on which the roller rolls, a cylindrical inner periphery flange part axially extending from an inner periphery end of the track surface, and a second claw part projecting from a tip end of the inner periphery flange part toward the outer diameter side to limit the axial movement of the retainer. Thus, bearing internal gaps to allow the eccentric rotation of the first track ring and the second track ring are provided between the outer periphery flange part and an outer edge part of the retainer, and between the inner periphery flange part and an inner edge part of the retainer. In addition, at least one of the first and second claw parts is a projection part formed by a bending process. Furthermore, an edge part of the retainer opposed to the projection part has a first slope part formed at a corner part on the side opposed to the track surface, and a second slope part having a radial length relatively shorter than that of the first slope part, and formed at a corner part on the opposite side in a thickness direction.

According to the above thrust roller bearing, heat generation and abrasion due to the contact between the retainer and the track ring during eccentric rotation can be effectively prevented by setting the bearing internal gap formed between the track ring and the retainer to be more than twice an eccentric amount of a support member.

In addition, the first and second slope parts function as guide surfaces when they pass through the projection part. Thus, the radial length of the first slope part functioning as the guide surface when the retainer and the track ring are assembled is set to be long, and the radial length of the second slope part functioning as the guide surface at the time of separation is set to be short. As a result, according to the thrust roller bearing, the retainer and the track ring are effectively prevented from being separated without damaging the assembling properties of them.

As one embodiment, the first and second slope parts are formed by bending the edge part. As the edge part is bent, the slope part has a curved surface configuration (R configuration) and the rigidity of the retainer can be improved. Alternatively, the slope part may be formed by chamfering the edge part (including C-chamfering and R-chamfering).

Preferably, a tip end of the projection part has a third slope part formed at a corner part on the side opposed to the track surface, and a fourth slope part having a radial length relatively longer than the third slope part, and formed at a corner part on the opposite side in the thickness direction. The third and fourth slope parts function as guide surfaces when the retainer passes through the projection part. Thus, the radial length of the fourth slope part functioning as the guide surface when the retainer and the track ring are assembled is-set to be long, and the radial length of the third slope part functioning as the guide surface at the time of separation is set to be short. Thus, according to the thrust roller bearing, the retainer and the track ring are effectively prevented from being separated without damaging the assembling properties of them.

Preferably, the first track ring, the second track ring, and the retainer are connected by engagement between the first claw part and the retainer, and by engagement between the second claw part and the retainer, and a relation $-0.1 \text{ mm} \leq \sigma \leq 0.5 \text{ mm}$ is satisfied wherein a represents a minimum overlapping part between the claw part and the retainer when the retainer is maximally one-sided in the radial direction in the track ring.

When the minimum overlapping part is more than 0.5 mm, the deformation amount of the retainer is great at the time of assembling, which could cause plastic deformation and damage. Meanwhile, when the minimum overlapping part is smaller than $-0.1$ mm, it is highly likely that the retainer and the track ring are separated. Thus, when the length is within the above range, the separation can be effectively prevented without damaging the assembling properties.

Preferably, the retainer is produced from SPC or SCM as a starting material through a soft nitriding process, a carburizing process, or a nitrocarburizing process as a heat treatment. In addition, it is preferable that the first and second track rings are produced from SPC or SCM as a starting material through a carburizing process or a nitrocarburizing process. Thus, the dimensional precision and the mechanical properties required for the retainer and the track ring can be provided.

Preferably, a relation $\theta_1 \geq 45°$ is satisfied wherein $\theta_1$ represents a contact angle between the first slope part and the projection part when the retainer is incorporated in the track ring having the projection part.

Still preferably, a relation $\theta_2 \leq 45°$ is satisfied wherein $\theta_2$ represents a contact angle between the second slope part and the projection part when the retainer is separated from the track ring having the projection part.

As the contact angle between the retainer and the projection part is increased, the retainer can more easily pass through the projection part. Meanwhile, as the contact angle is decreased, the retainer is harder to pass through the projection part. Thus, the thrust roller bearing is likely to be incorporated but not likely to be separated by setting the contact angle $\theta_1$ between the first slope part and the projection part to be not less than 45°, and setting the contact angle $\theta_2$ between the second slope part and the projection part to be not more than 45°.

A thrust roller bearing according to the present invention includes a plurality of rollers, a retainer to retain the plurality of rollers, an annular first track ring having a track surface on which the roller rolls, a cylindrical outer periphery flange part axially extending from an outer periphery end of the track surface, and a first claw part projecting from a tip end of the outer periphery flange part toward the inner diameter side to limit the axial movement of the retainer, and an annular second track ring having a track surface on which the roller rolls, a cylindrical inner periphery flange part axially extending from an inner periphery end of the track surface, and a second claw part projecting from a tip end of the inner periphery flange part toward the outer diameter side to limit the axial movement of the retainer. Thus, bearing internal gaps to allow the eccentric rotation of the first track ring and the second track ring are provided between the outer periphery flange part and an outer edge part of the retainer, and between the inner periphery flange part and an inner edge part of the retainer. In addition, at least one of the first and second claw parts is a projection part formed by a bending process. Furthermore, an tip end of the projection part has a first slope part formed at a corner part on the side opposed to the track surface, and a second slope part having a radial length relatively longer than that of the first slope part, and formed at a corner part on the opposite side in a thickness direction.

According to the above thrust roller bearing, heat generation and abrasion due to the contact between the retainer and the track ring during eccentric rotation can be effectively prevented by setting the bearing internal gap formed between the track ring and the retainer to be more than twice an eccentric amount of a support member.

In addition, according to the above thrust roller bearing, the first and second slope parts function as guide surfaces when the retainer passes through the projection part. Thus, the radial length of the second slope part functioning as the guide surface when the retainer and the track ring are assembled is set to be long, and the radial length of the first slope part functioning as the guide surface at the time of separation is set to be short. Thus, according to the thrust roller bearing, the retainer and the track ring are effectively prevented from being separated without damaging the assembling properties of them.

A thrust roller bearing according to the present invention includes a plurality of rollers, a retainer to retain the plurality of rollers, and a couple of track rings each having a track surface on which the rollers roll, in which the retainer and the couple of track rings are connected so as not to be separated from each other by force of less than 30N. One of the couple of track rings is a first track ring formed of an annular member having a cylindrical outer periphery flange part axially extending from an outer periphery end of the track surface, and a first claw part projecting from a tip end of the outer periphery flange part toward the inner diameter side to limit the axial movement of the retainer. The other of the couple of track ring is a second track ring formed of an annular member having a cylindrical inner periphery flange part axially extending from an inner periphery end of the track surface, and a second claw part projecting from a tip end of the inner periphery flange part toward the outer diameter side to limit the axial movement of the retainer. Thus, bearing internal gaps to allow the eccentric rotation of the first track ring and the second track ring are provided between the outer periphery flange part and an outer edge part of the retainer, and between the inner periphery flange part and an inner edge part of the retainer. In addition, at least one of the first and second claw parts is a projection part formed by a bending process. Furthermore, the first track ring, the second track ring, and the retainer are connected by engagement between the first claw part and the retainer, and by engagement between the second claw part and the retainer, and a relation $-0.1 \text{ mm} \leqq \sigma \leqq 0.5$ mm is satisfied wherein a represents a minimum overlapping part between the claw part and the retainer when the retainer is maximally one-sided in the radial direction in the track ring.

According to the above thrust roller bearing, heat generation and abrasion due to the contact between the retainer and the track ring during eccentric rotation can be effectively prevented by setting the bearing internal gap formed between the track ring and the retainer to be more than twice an eccentric amount of a support member.

In addition, when the minimum overlapping part is more than 0.5 mm, the deformation amount of the retainer is great at the time of assembling, which could cause plastic deformation and damage. Meanwhile, when the minimum overlapping part is smaller than −0.1 mm, it is highly likely that the retainer and the track ring are separated. Thus, when the length is within the above range, the separation can be effectively prevented without damaging the assembling properties.

A torque converter according to the present invention includes an impeller connected to an input shaft, a turbine connected to an output shaft, a stator to orient operation fluid from the turbine to the impeller, and the thrust roller bearing described above and arranged between the turbine and the stator and/or between the impeller and the stator. When the above thrust roller bearing is used as a bearing to support the turbine and the impeller in which eccentric rotation is provided, the highly reliable torque converter can be provided.

According to the present invention, since the first slope part functioning as the insertion guide surface when the retainer is incorporated in the track ring is largely provided, the retainer and the track ring can be effectively prevented from being separated without damaging the assembling properties between them in the thrust roller bearing. In addition, the highly reliable torque converter can be provided by employing the above thrust roller bearing.

BEST MODE FOR CARRYING OUT THE INVENTION

Figure 1:
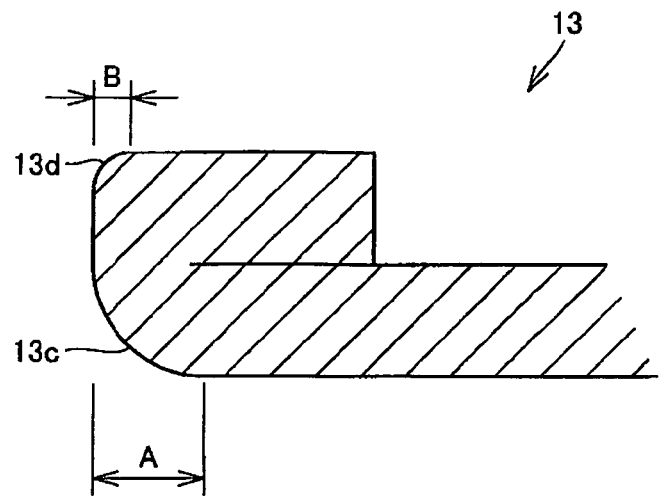
FIG. 1 is an enlarged view showing a part P in FIG. 7.
Figure 5:
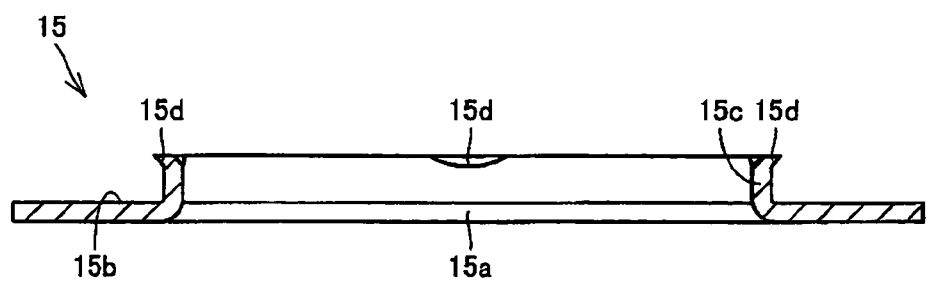
FIG. 5 is a sectional view showing a second track ring in FIG. 2.
Figure 6:
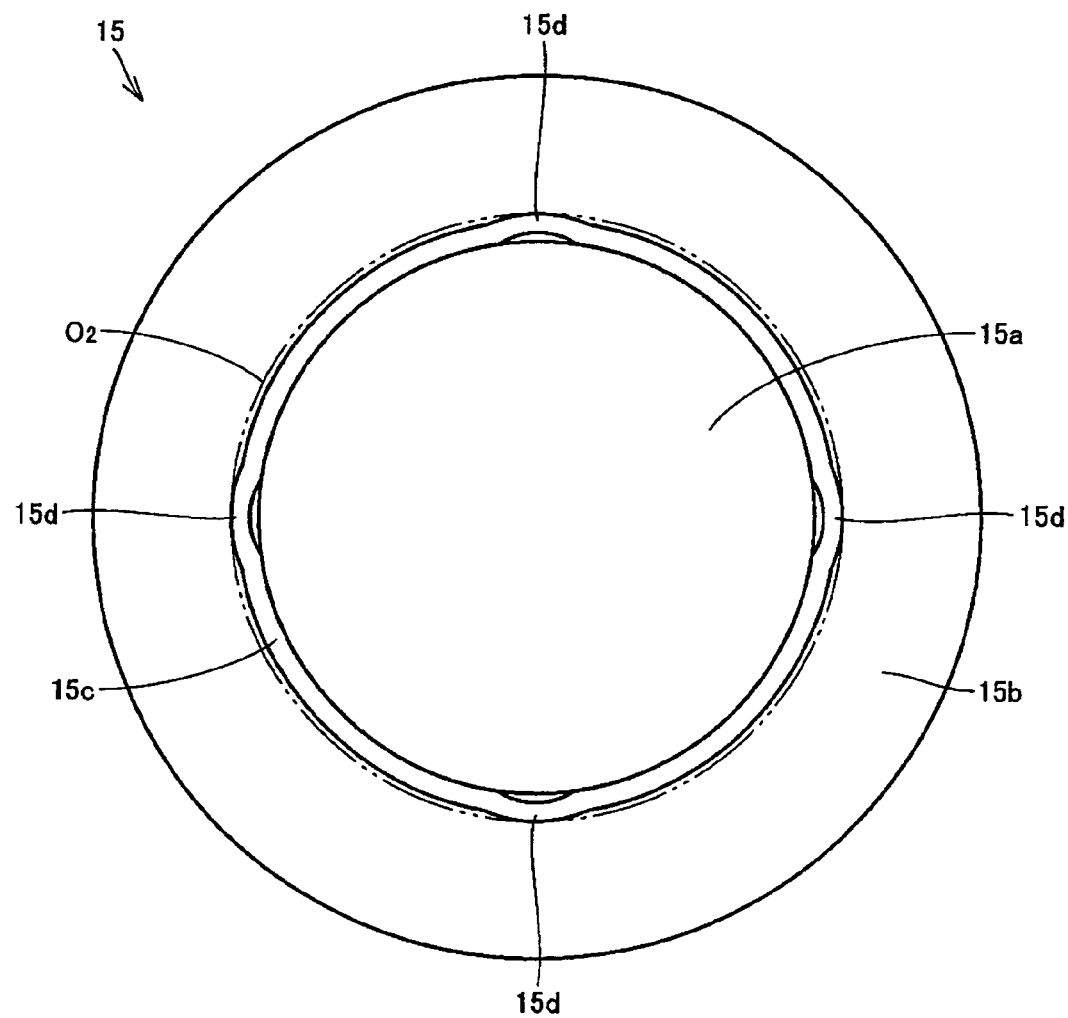
FIG. 6 is a front view showing the second track ring in FIG. 2.
Figure 7:
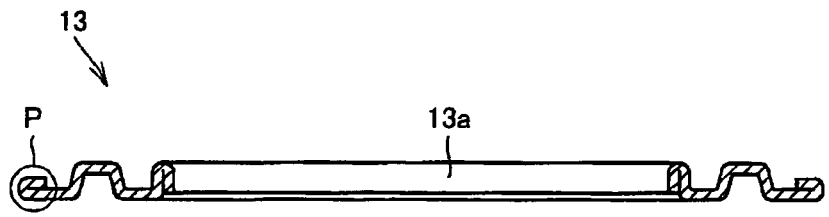
FIG. 7 is a sectional view showing a retainer in FIG. 2.
Figure 8:
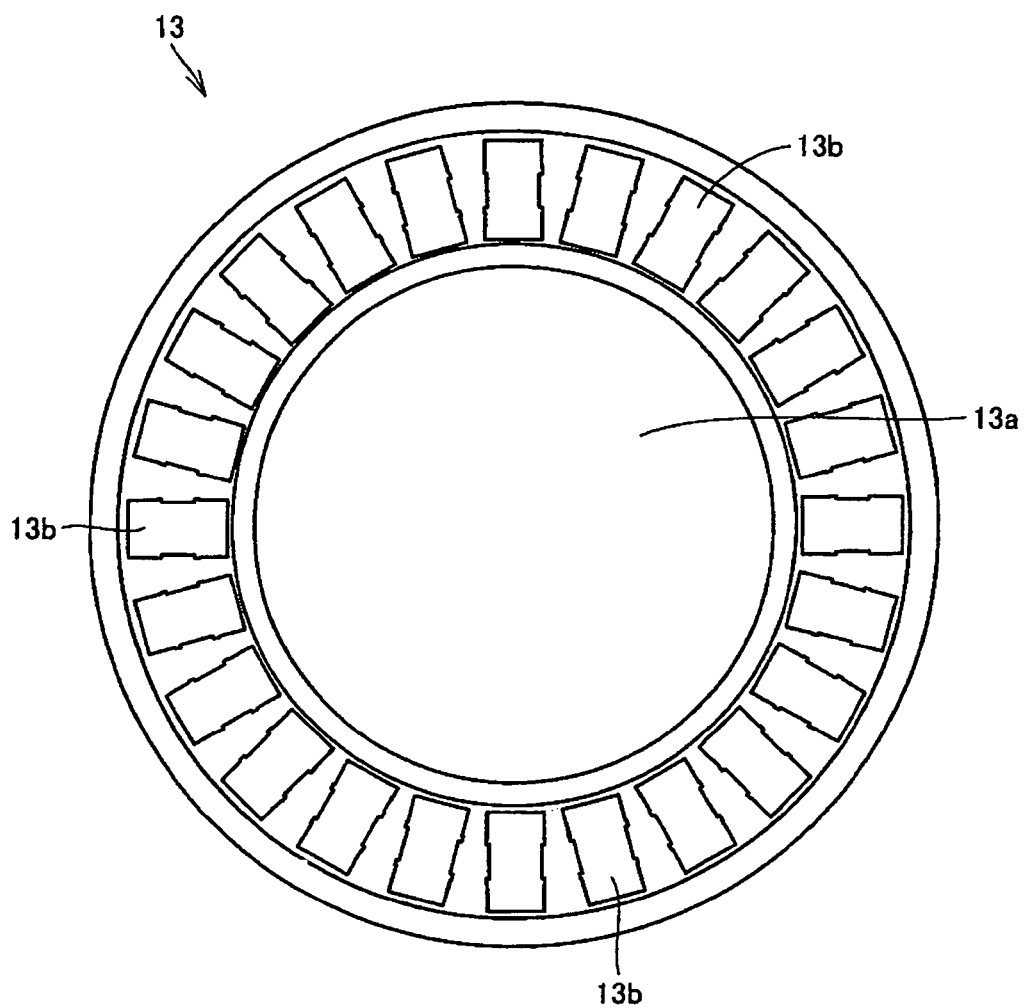
FIG. 8 is a front view showing the retainer in FIG. 2.

A thrust roller bearing 11 according to one embodiment of the present invention will be described with reference to FIGS. 1 to 8 hereinafter. FIG. 1 is an enlarged view showing a part P in FIG. 7, FIG. 2 is a view showing the thrust roller bearing 11, FIGS. 3 and 4 are a sectional view and a plan view showing a first track ring 14, respectively, FIGS. 5 and 6 are a sectional view and a plan view showing a second track ring 15, respectively, and FIGS. 7 and 8 are a sectional view and a plan view showing a retainer 13, respectively.

Figure 2:
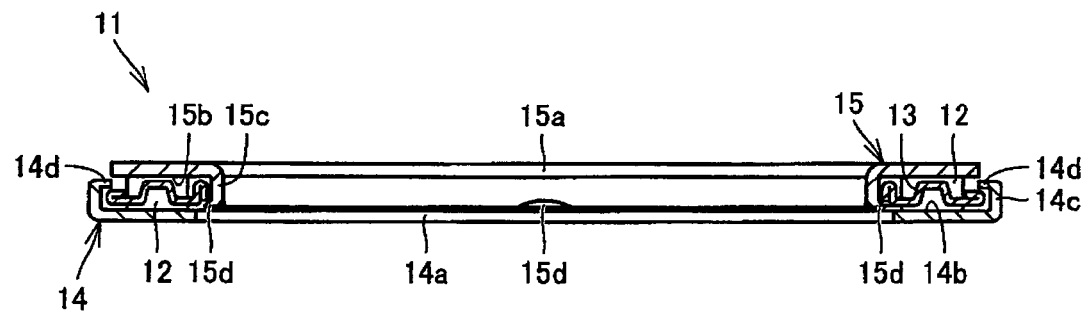
FIG. 2 is a view showing a thrust roller bearing according to one embodiment of the present invention.

First, referring to FIG. 2, the thrust roller bearing 11 is a trinity thrust roller bearing composed of a plurality of rollers 12, the retainer 13 to retain the plurality of rollers 12, and the first and second track rings 14 and 15 to hold the retainer 13.

Figure 3:
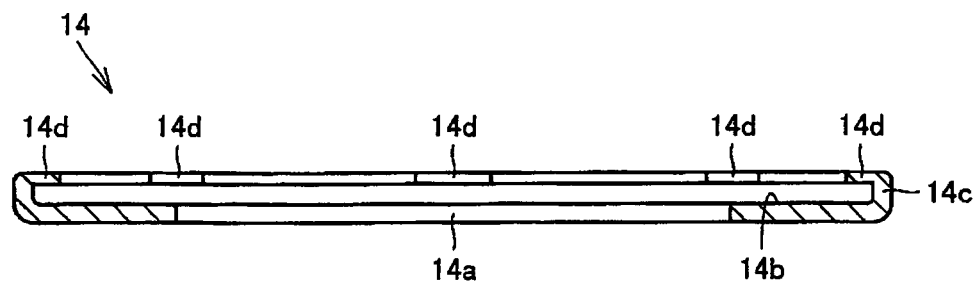
FIG. 3 is a sectional view showing a first track ring in FIG. 2.
Figure 4:
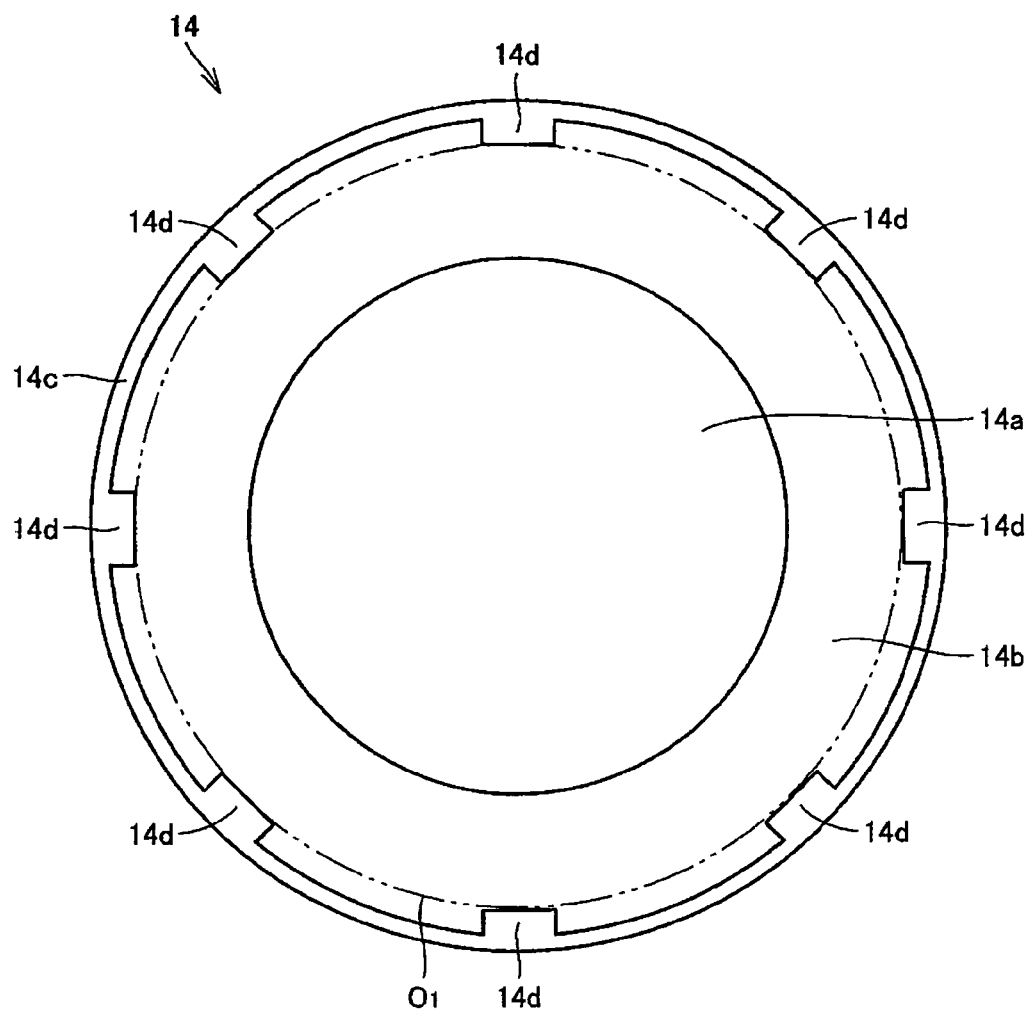
FIG. 4 is a front view showing the first track ring in FIG. 2.

Referring to FIGS. 3 and 4, the first track ring 14 is an annular member having a through hole 14a penetrating its center in a thickness direction. Thus, the first track ring 14 includes a track surface 14b, on which a roller 12 rolls, provided as a wall surface on one side in the thickness direction, a cylindrical outer periphery flange part 14c extending from an outer edge part of the annular member toward the track surface 14b in the thickness direction, and a plurality of projection parts 14d serving as first claw parts projecting from a tip end of the outer periphery flange part 14c toward a radial inner direction.

The outer periphery flange part 14c is positioned on the outer side of an outer edge part of the retainer 13 after the thrust roller bearing 11 has been assembled. The projection parts 14d project from a plurality of positions of the outer periphery flange part 14c toward the radial inner side. The projection part 14d engages with the outer edge part of the retainer 13 to prevent the retainer 13 from being separated from the first track ring 14. In addition, according to this embodiment, eight projection parts 14d are provided with equal space on a circumference of the outer periphery flange part 14c.

In addition, when it is assumed that a circle passing through tip ends of the eight projection parts 14d is $O_1$ (shown by a two-dot chain line in FIG. 4), a projection amount of the projection part 14d is adjusted such that a diameter of the circle $O_1$ is smaller than an outer diameter dimension of the retainer 13. Therefore, the retainer 13 is incorporated in the first track ring 14 with the outer edge part of the retainer 13 and the projection part 14d elastically deformed.

Referring to FIGS. 5 and 6, the second track ring 15 is an annular member having a through hole 15a penetrating its center in a thickness direction. Thus, it includes a track surface 15b, on which the roller 12 rolls, provided as a wall surface on one side in the thickness direction, a cylindrical inner periphery flange part 15c extending from an inner edge part of the annular member toward the track surface 15b in the thickness direction, and a plurality of stakes 15d serving as second claw parts projecting from a tip end of the inner periphery flange part 15c toward the radial outer side.

The inner periphery flange part 15c is positioned on the inner side of an inner edge part of the retainer 13 after the thrust roller bearing 11 has been assembled. The stakes 15d project from a plurality of positions of the inner periphery flange part 15c toward the radial outer side. The stake 15d engages with the inner edge part of the retainer 13 to prevent the retainer 13 from being separated from the second track ring 15. In addition, according to this embodiment, four stakes are provided with equal space on a circumference of the inner periphery flange part 15c.

In addition, when it is assumed that a circle passing through tip ends of the four stakes 15d is $O_2$ (shown by a two-dot chain line in FIG. 6), a projection amount of the stake 15d is adjusted such that a diameter of the circle $O_2$ is larger than an inner diameter dimension of the retainer 13. Therefore, the retainer 13 is incorporated in the second track ring 15 with the inner edge part of the retainer 13 and the stake 15d elastically deformed.

The above described first and second track rings 14 and 15 are produced from SPC or SCM as a starting material through a pressing process. Then, a carburizing process or a nitrocarburizing process is performed as a heat treatment to provide predetermined mechanical properties.

In addition, the projection part 14d provided in the first track ring 14, and the stake 15d provided in the second track ring 15 function as claw parts to hold the retainer 13. In addition, the projection part 14d is formed by bending the tip end of the outer periphery flange part 14c toward the radial inner side by a bending process. In addition, the projection part 14d strongly holds the retainer 13 as compared with the stake 15d.

Referring to FIGS. 7 and 8, the retainer 13 is an annular member having a through hole 13a penetrating its center in a thickness direction. In addition, a plurality of pockets 13b for housing the rollers 12 are radially arranged on its wall surface. Referring to FIG. 1, the outer edge part of the retainer 13 is folded back toward the radial inner side, and first and second slope parts 13c and 13d are formed at its corner parts.

The first and second slope parts 13c and 13d are curved so as to have predetermined curvatures. Thus, a radial length A of the first slope part 13c is longer than a radius length B of the second slope part 13d (A>B). In addition, referring to FIG. 2, after the retainer 13 has been incorporated in the first track ring 14, the first slope part 13c is arranged so as to be opposed to the track surface 14b.

The above retainer 13 is produced from SPC or SCM as a starting material through a pressing process. Furthermore, a soft nitriding process, a carburizing process or a nitrocarburizing process is performed as a heat treatment to provide predetermined mechanical properties.

Figure 9:
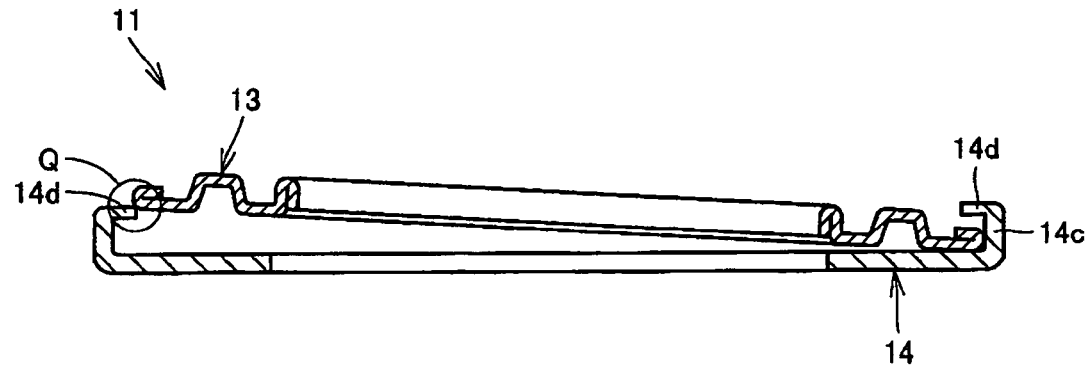
FIG. 9 is a view showing a state when the retainer is incorporated in the track ring.

Next, a method for incorporating the retainer 13 in the first track ring 14 will be described with reference to FIGS. 9 and 10. FIG. 9 is a view showing a state when the retainer 13 is incorporated in the first track ring 14, and FIG. 10 is an enlarged view showing a part Q in FIG. 9.

First, referring to FIG. 9, when the retainer 13 is incorporated in the first track ring 14, one side (right side in FIG. 9) of the outer edge part of the retainer 13 is inserted in the projection part 14d, so that the outer edge part of the retainer 13 abuts on the inner diameter surface of the flange part 14c. At this time, the other side (left side in FIG. 9) of the retainer 13 is caught by the projection part 14d and cannot be incorporated. Thus, the retainer 13 is incorporated in the first track ring 14 with the retainer 13 and the projection part 14d elastically deformed.

Figure 10:
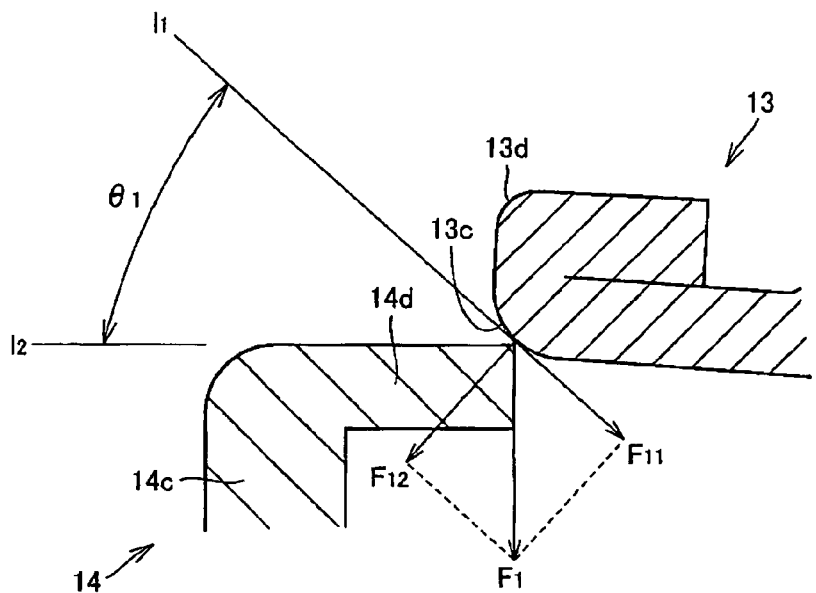
FIG. 10 is an enlarged view showing a part Q in FIG. 9.

Referring to FIG. 10, the first slope part 13c of the retainer 13 is in contact with the corner part of the projection part 14d in the part Q in FIG. 9. Here, the first slope part 13c functions as an insertion guide surface when the retainer 13 is incorporated in the first track ring 14.

More specifically, a built-in load $F_1$ acts on the contact part between the first slope part 13c and the projection part 14d in the insertion direction of the retainer 13 (downward in FIG. 10). This built-in load $F_1$ can be decomposed into a component force $F_{11}$ acting in a direction parallel to a tangent line $l_1$ at the position where the corner part of the projection part 14d contacts with the first slope part 13c, and a component force $F_{12}$ acting in a direction perpendicular to the tangent line $l_1$. Thus, when the component force $F_{11}$ exceeds a certain value, the retainer 13 is incorporated in the first track ring 14 through the projection part 14d.

Here, the component force $F_{11}$ is increased in proportion to a contact angle $\theta_1$ formed between the tangent line $l_1$ and a straight line $l_2$ parallel to the surface of the projection part 14d. Thus, when $\theta_1 \geq 45°$, a relation $F_{11} \geq F_{12}$ is provided. Therefore, by adjusting the radial length A of the first slope part 13c such that the contact angle $\theta_1$ becomes 45° or more, the built-in load $F_1$ can be small when the retainer 13 is incorporated in the first track ring 14.

Figure 11:
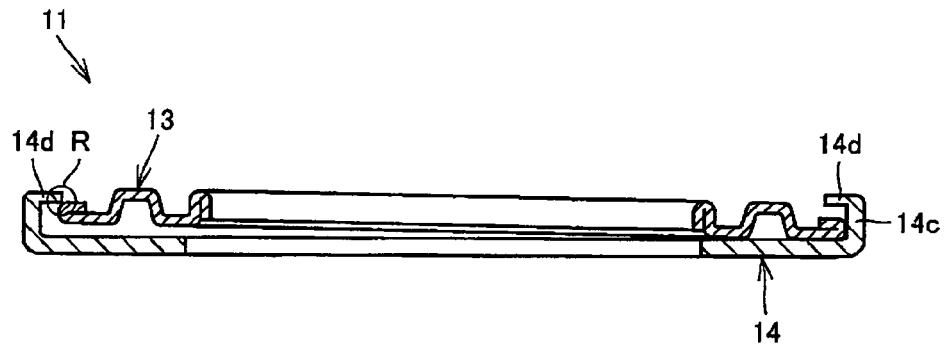
FIG. 11 is a view showing a state when the retainer is separated from the track ring.

Next, a method for separating the retainer 13 from the first track ring 14 will be described with reference to FIGS. 11 and 12. FIG. 11 is a view showing a state when the retainer 13 is separated from the first track ring 14, and FIG. 12 is an enlarged view showing a part R in FIG. 11.

First, referring to FIG. 11, when the retainer 13 is separated from the first track ring 14, under the condition that one side (right side in FIG. 11) of the outer edge part of the retainer 13 abuts on the inner diameter surface of the flange part 14c, the other side (left side in FIG. 11) is lifted. At this time, since the outer edge part of the retainer 13 is caught by the projection part 14d, both cannot be separated. Here, when external force is applied to the thrust roller bearing 11, the retainer 13 and the projection part 14d are elastically deformed and both are separated.

Figure 12:
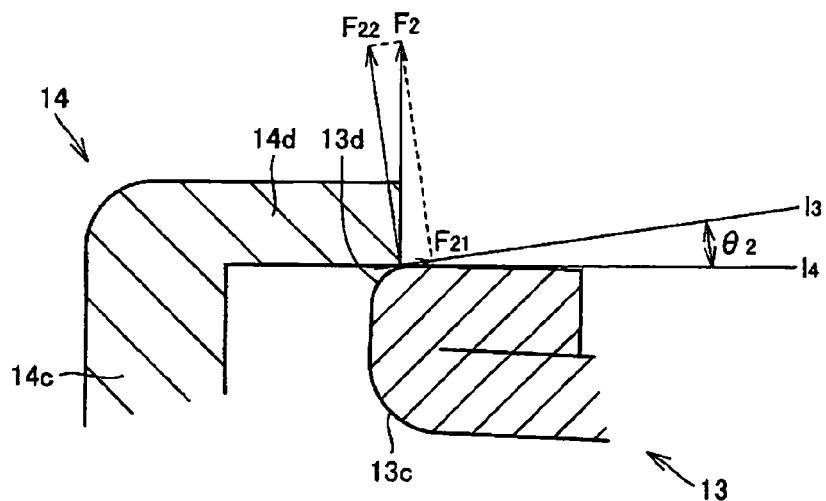
FIG. 12 is an enlarged view showing a part R in FIG. 11.

Referring to FIG. 12, the second slope part 13d of the retainer 13 is in contact with the corner part of the projection part 14d in the part R in FIG. 11. A separation load $F_2$ acts on the contact part between the second slope part 13d and the projection part 14d in the separation direction of the retainer 13 (upward in FIG. 12). This separation load $F_2$ can be decomposed into a component force $F_{21}$ acting in a direction parallel to a tangent line $l_3$ between the corner part of the projection part 14d and the second slope part 13d, and a component force $F_{22}$ acting in a direction perpendicular to the tangent line $l_3$. Thus, when the component force $F_{21}$ exceeds a certain value, the retainer 13 is separated from the first track ring 14 through the projection part 14d.

Here, the component force $F_{21}$ is increased in proportion to a contact angle $\theta_2$ formed between the tangent line $l_3$ and a straight line $l_4$ parallel to the surface of the projection part 14d. Thus, when $\theta_2 \leq 45°$, a relation $F_{21} \leq F_{22}$ is provided. Therefore, by adjusting the radial length B of the second slope part 13d such that the contact angle $\theta_2$ becomes 45° or less, the separation load $F_2$ can be great when the retainer 13 is separated from the first track ring 14.

Figure 13:
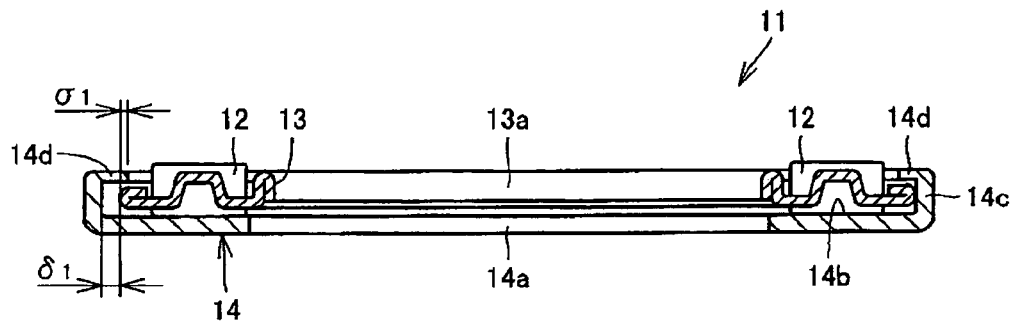
FIG. 13 is a view showing a state in which the retainer is maximally one-sided in a radial direction in the track ring.

Next, a dimensional relation between the retainer 13 and the first track ring 14 will be described with reference to FIG. 13. In addition, FIG. 13 is a view showing a state when the retainer 13 is maximally one-sided in the track ring 14 in a radial direction. The following description will be similarly applied to a relation between the retainer 13 and the second track ring 15.

First, a minimum overlapping part $\sigma_1$ between the outer edge part of the retainer 13 and the projection part 14d is set such that $-0.1 \text{ mm} \leq \sigma_1 \leq 0.5 \text{ mm}$. In addition, the minimum overlapping part $\sigma_1$ is calculated by a formula $\sigma_1 = D_1 - (D_2 - t_1)$ wherein $D_1$ represents an outer diameter dimension of the retainer 13, $D_2$ represents an inner diameter dimension of the flange part 14c, and $t_1$ represents an projection amount of the projection part 14d.

As the minimum overlapping part $\sigma_1$ becomes larger than 0.5 mm, the deformation amounts of the retainer 13 and the projection part 14d are increased at the time of assembling, which could cause deformation and damage. Meanwhile, when the minimum overlapping part $\sigma_1$ is less than −0.1 mm, it is highly likely that the retainer 13 and the first track ring 14 are separated. Thus, as long as it is within the above range, the separation can be effectively prevented without damaging assembling properties.

In addition, when the minimum overlapping part $\sigma_1$ is −0.1 mm, the projection part 14d does not engage with the outer edge part of the retainer 13. However, when the plurality of projection parts 14d are provided on the circumference of the outer periphery flange part 14c as described in the embodiment shown in FIG. 4, the retainer 13 engages with the adjacent projection parts 14d. According to the above constitution, the separation load $F_2$ between the retainer 13 and the first track ring 14 is 30 N or more. As a result, both can be effectively prevented from being separated at the time of transportation, especially at the time of transportation with the track surface 14b kept vertically.

In addition, a radial bearing internal gap $\delta_1$ formed between the outer edge part of the retainer 13 and the outer periphery flange part 14c is adjusted based on an eccentric amount of a support member. More specifically, it is set to be more than twice the eccentric amount of the support member. Thus, the heat and abrasion that are generated due to the contact between the retainer and the track ring during the eccentric rotation can be effectively prevented.

In addition, although the outer edge part of the retainer 13 is folded back to form the first and second slope parts 13c and 13d having the curved configuration (R configuration) in the above embodiment, the first and second slope parts 13c and 13d may be formed by another method. For example, the corner part of the outer edge part may be chamfered. In addition, the first and second slope parts 13c and 13d may have a linear configuration (tapered configuration) instead of the curved configuration (R configuration).

In addition, the position and number of the projection parts 14d can be optionally determined in the first track ring 14 according to the above embodiment. However, when the number of the projection parts 14d is small, the retainer 13 could not be appropriately held. Meanwhile, when the projection parts 14d are provided too many, it becomes difficult to incorporate the retainer 13. In addition, the projection parts 14d are preferably arranged at regular intervals in view of holding the retainer 13 appropriately. This is similarly applied to the stakes 15d formed in the second track ring 15.

In addition, although the thrust roller bearing 11 includes the first track ring 14 having the projection parts 14d, the second track ring 15 having the stakes 15d, and the retainer having the first and second slope parts 13c and 13d at its outer edge parts in the above embodiment, the thrust roller bearing may have another constitution. For example, the stakes may be formed at the outer periphery flange part of the first track ring, and the projection parts may be formed in the inner periphery flange part of the second track ring. In this case, the first and second slope parts are to be provided at an inner edge part of the retainer. In addition, the projection parts may be formed in the first and second track rings. In this case, the first and second slope parts are to be provided in both outer and inner edge parts of the retainer.

Next, a description will be made of a test performed to confirm the effect of the present invention with reference to table 1. According to the effect confirming test, the built-in load and the separation load were measured in three kinds of thrust roller bearings (test bearings 1 to 3) in which the radial dimension A of the first slope part 13c, the radial dimension B of the second slope part 13d, and the minimum overlapping part of are set as shown in the table 1. In addition, the incorporation was performed by the method shown in FIGS. 9 and 10, and the separation was performed by the method shown in FIGS. 11 and 12.

TABLE 1

|  | A (mm) | B (mm) | σ 1 (mm) | Built-in load (N) | Separation load (N) |
|---|---|---|---|---|---|
| Test bearing 1 | 0~0.3 | 0~0.3 | 0.1 | 75 | 75 |
| Test bearing 2 | 0~0.3 | 0.4~0.8 | 0.1 | 76 | 49 |
| Test bearing 3 | 0.4~0.8 | 0~0.3 | 0.1 | 51 | 76 |

Referring to the table 1, the built-in load and the separation load were about the same in the test bearing 1 in which the radial dimensions of the first slope part 13c and the second slope part 13d are about the same (A≈B). Meanwhile, the built-in load exceeded the separation load in the test bearing 2 in which A<B. In addition, the separation load exceeded the built-in load in the test bearing 3 in which A>B.

As described above, it has been confirmed that the retainer 13 can be incorporated in the track ring 14 more easily as the radial dimension A of the first slope part 13c is increased. Similarly, it has been confirmed that the retainer 13 is harder to be separated from the first track ring 14 as the radial dimension B of the second slope part 13d is decreased. Thus, it has been confirmed that when A>B, the retainer 13 can be easily incorporated in the first track ring 14, and they are hard to be separated in the thrust roller bearing 11.

Figure 14:
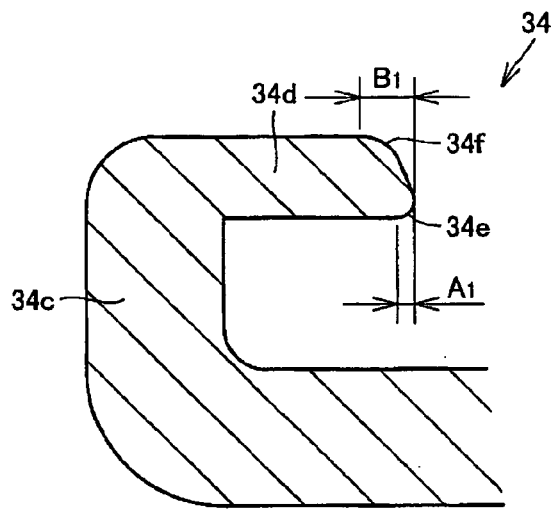
FIG. 14 is an enlarged view showing a part S in FIG. 16.
Figure 18:
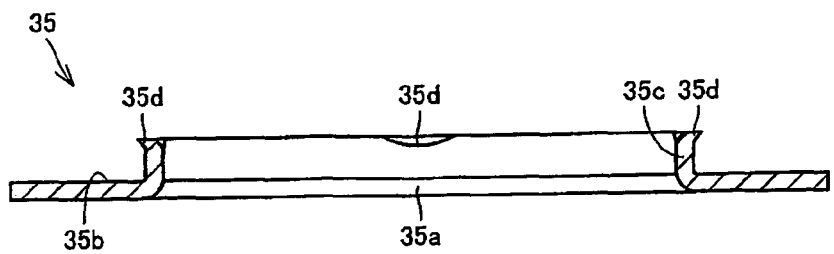
FIG. 18 is a sectional view showing a second track ring in FIG. 15.
Figure 19:
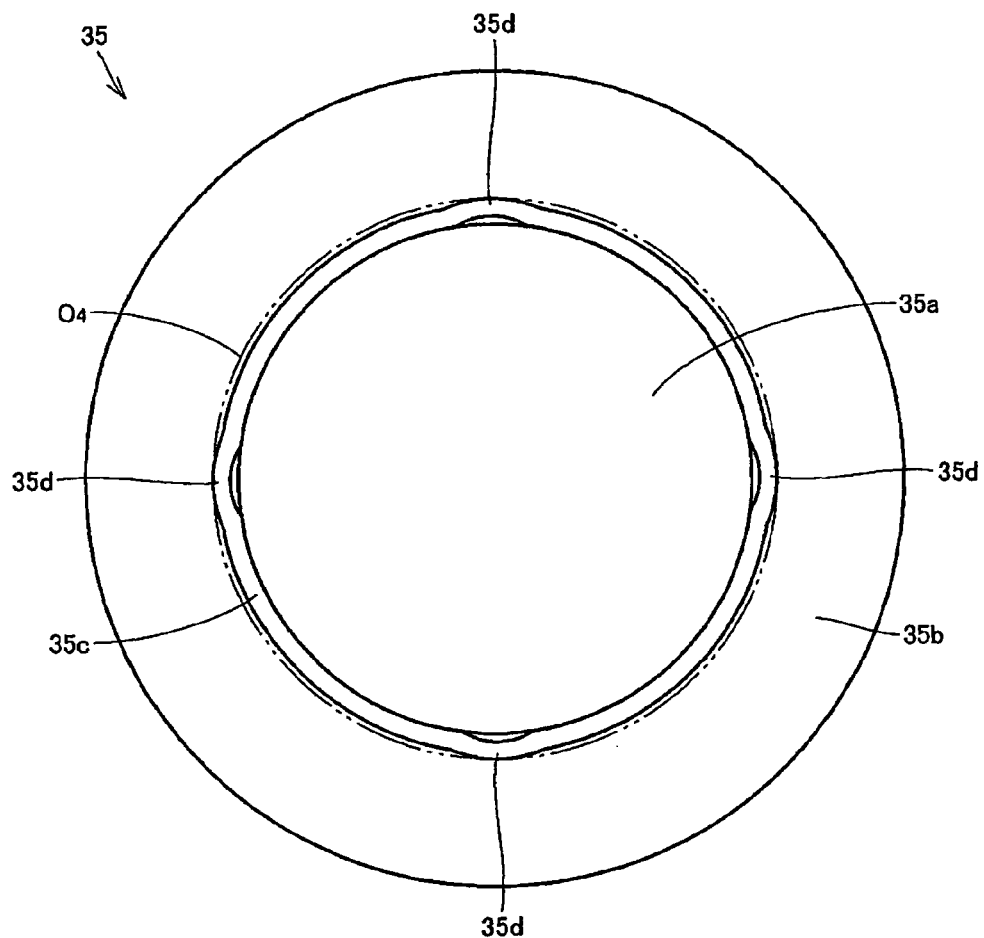
FIG. 19 is a front view showing the second track ring in FIG. 15.
Figure 20:
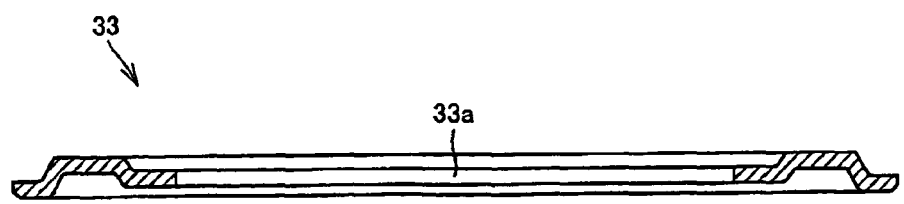
FIG. 20 is a sectional view showing a retainer in FIG. 15.
Figure 21:
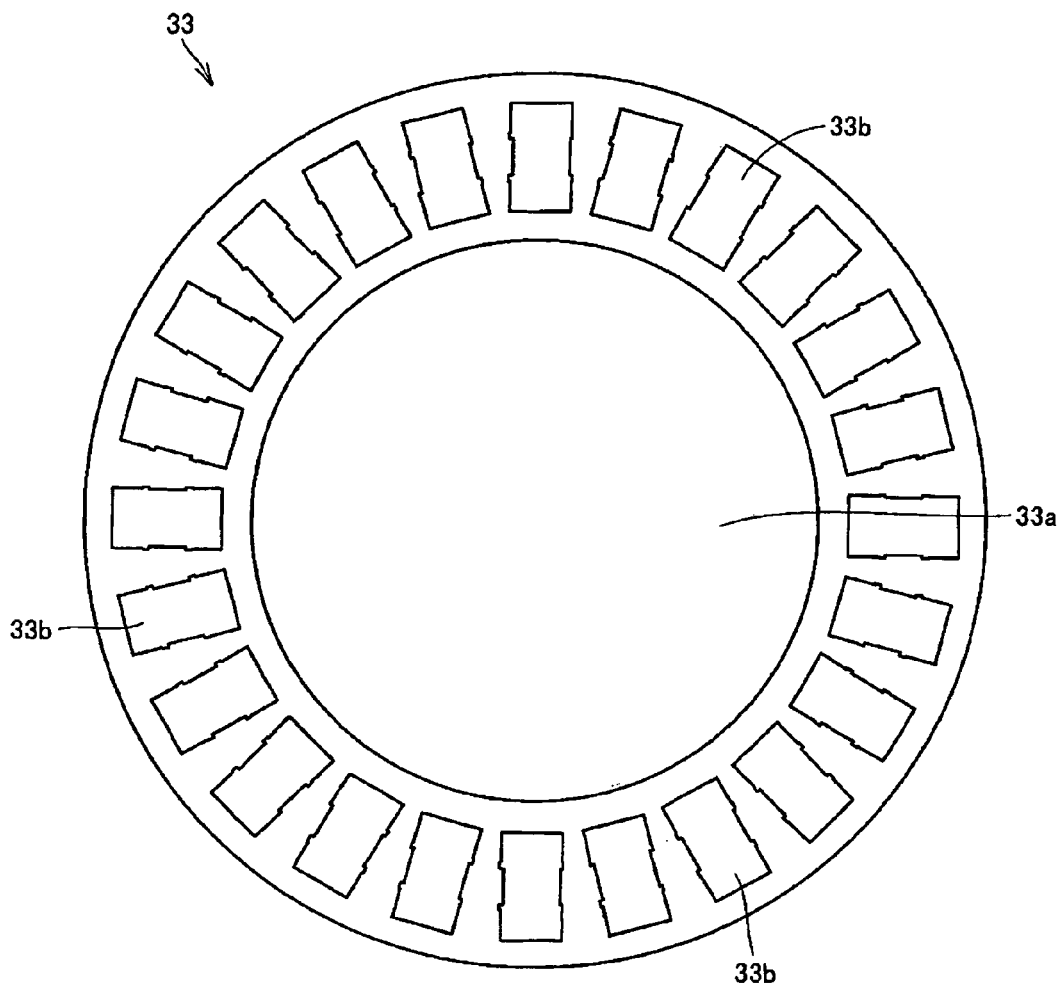
FIG. 21 is a front view showing the retainer in FIG. 15.

Next, a thrust roller bearing 31 according to another embodiment of the present invention will be described with reference to FIGS. 14 to 21. In addition, FIG. 14 is an enlarged view showing a part S in FIG. 16, FIG. 15 is a view showing the thrust roller bearing 31, FIGS. 16 and 17 are a sectional view and a plan view showing a first track ring 34, respectively, FIGS. 18 and 19 are a sectional view and a plan view showing a second track ring 35, respectively, and FIGS. 20 and 21 are a sectional view and a plan view showing a retainer 33, respectively.

Figure 15:
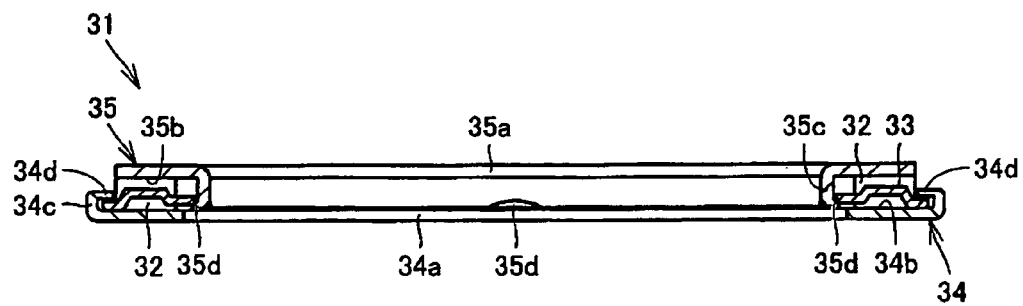
FIG. 15 is a view showing a thrust roller bearing according to another embodiment of the present invention.

First, referring to FIG. 15, the thrust roller bearing 31 is a trinity thrust roller bearing composed of a plurality of rollers 32, the retainer 33 holding the plurality of rollers 32, the first and second track rings 34 and 35 to hold the retainer 33.

Figure 16:
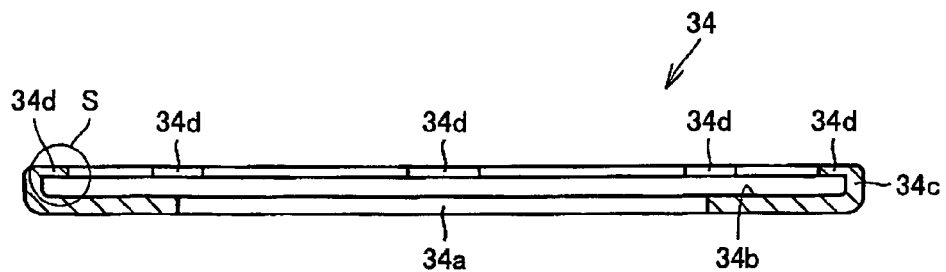
FIG. 16 is a sectional view showing a first track ring in FIG. 15.
Figure 17:
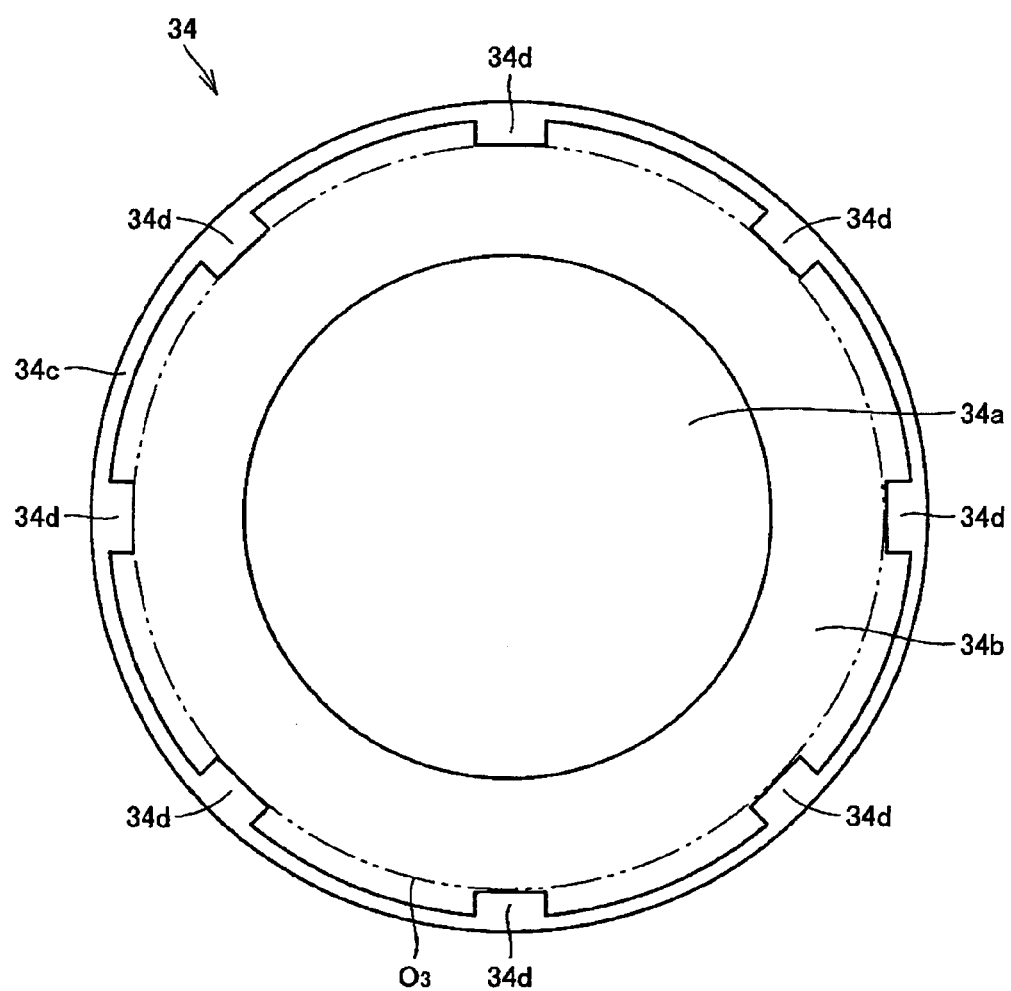
FIG. 17 is a front view showing the first track ring in FIG. 15.

Referring to FIGS. 16 and 17, the first track ring 34 is an annular member having a through hole 34a penetrating its center in a thickness direction. Thus, it includes a track surface 34b, on which the roller 32 rolls, provided as a wall surface on one side in the thickness direction, a cylindrical outer periphery flange part 34c extending from an outer edge part of the annular member toward the track surface 34b in the thickness direction, and a plurality of projection parts 34d serving as first claw parts projecting from a tip end of the outer peripheral flange part 34c toward a radial inner direction.

The outer periphery flange part 34c is positioned on the outer side of an outer edge part of the retainer 33 after the thrust roller bearing 31 has been assembled. The projection parts 34d project from a plurality of positions of the outer periphery flange part 34c toward the radial inner side. The projection part 34d engages with the outer edge part of the retainer 33 to prevent the retainer 33 from being separated from the first track ring 34. In addition, the projection parts 34d according to this embodiment are provided at equivalently-spaced eight positions on a circumference of the outer periphery flange part 34c.

In addition, when it is assumed that a circle passing through tip ends of the eight projection parts 34d is $O_3$ (shown by a two-dot chain line in FIG. 17), a projection amount of the projection part 34d is adjusted such that a diameter of the circle $O_3$ is smaller than an outer diameter dimension of the retainer 33. Therefore, the retainer 33 is incorporated in the first track ring 34 with the outer edge part of the retainer 33 and the projection part 34d elastically deformed.

Referring to FIG. 14, the tip end of the projection part 34d has a third slope part 34e at a corner part on the side opposed to the track surface 34b, and a fourth slope part 34f at a corner part on the opposite side in the thickness direction. The third and fourth slope parts 34e and 34f are curved surfaces having predetermined curvatures. Thus, a radial length $A_1$ of the third slope part 34e is shorter than a radial length $B_1$ of the fourth slope part 34f ($A_1 < B_1$).

Referring to FIGS. 18 and 19, the second track ring 35 is an annular member having a through hole 35a penetrating its center in a thickness direction. Thus, it includes a track surface 35b, on which the roller 32 rolls, provided as a wall surface on one side in the thickness direction, a cylindrical inner periphery flange part 35c extending from an inner edge part of the annular member toward the track surface 35b in the thickness direction, and a plurality of stakes 35d serving as second claw parts projecting from a tip end of the inner periphery flange part 35c toward the radial outer side.

The inner periphery flange part 35c is positioned on the inner side of an inner edge part of the retainer 33 after the thrust roller bearing 31 has been assembled. The stakes 35d project from a plurality of positions of the inner periphery flange part 35c toward the radial outer side. The stake 35d engages with the inner edge part of the retainer 33 to prevent the retainer 33 from being separated from the second track ring 35. In addition, the stakes according to this embodiment are provided at equivalently-spaced four positions on a circumference of the inner periphery flange part 35c.

In addition, when it is assumed that a circle passing through tip ends of the four stakes 35d is $O_4$ (shown by a two-dot chain line in FIG. 19), a projection amount of the stake 35d is adjusted such that a diameter of the circle $O_4$ is larger than an inner diameter dimension of the retainer 33. Therefore, the retainer 33 is incorporated in the second track ring 35 with the inner edge part of the retainer 33 and the stake 35d elastically deformed.

The above first and second track rings 34 and 35 are produced from SPC or SCM as a starting material through a pressing process. Then, a carburizing process or a nitrocarburizing process is performed as a heat treatment to provide predetermined mechanical properties.

In addition, the projection part 34d provided in the first track ring 34, and the stake 35d provided in the second track ring 35 function as claw parts to hold the retainer 33. In addition, the projection part 34d is formed by bending the tip end of the outer periphery flange part 34c toward the radial inner side by a bending process. In addition, the projection part 34d strongly holds the retainer 33 as compared with the stake 35d.

Referring to FIGS. 20 and 21, the retainer 33 is an annular member having a through hole 33a penetrating its center in a thickness direction. In addition, a plurality of pockets 33d for housing the rollers 32 are radially arranged on its wall surface.

The above retainer 33 is produced from SPC or SCM as a starting material through a pressing process. Furthermore, a soft nitriding process, a carburizing process or a nitrocarburizing process is performed as a heat treatment to provide predetermined mechanical properties.

Next, a method for incorporating the retainer 33 in the first track ring 34 will be described with reference to FIGS. 22 and 23. In addition, FIG. 22 is a view showing a state when the retainer 33 is incorporated in the first track ring 34, and FIG. 23 is an enlarged view showing a part T in FIG. 22.

Figure 22:
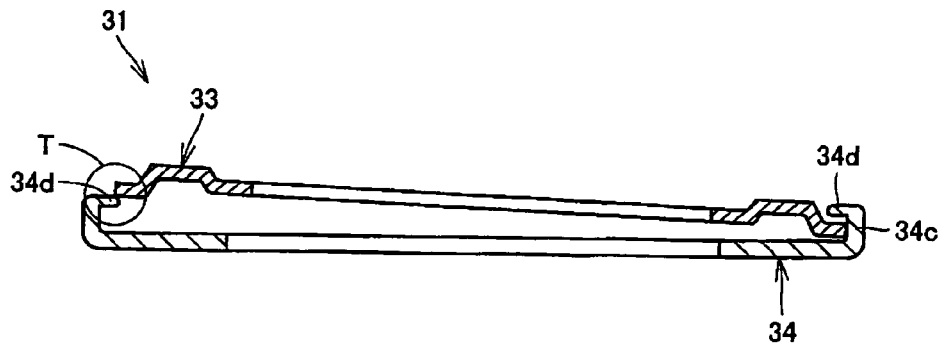
FIG. 22 is a view showing a state when the retainer is incorporated in the track ring.

First, referring to FIG. 22, when the retainer 33 is incorporated in the first track ring 34, one side (right side in FIG. 22) of the outer edge part of the retainer 33 is inserted in the projection part 34d, so that the outer edge part of the retainer 33 abuts on the inner diameter surface of the flange part 34c. At this time, the other side (left side in FIG. 22) of the retainer 33 is caught by the projection part 34d and cannot be incorporated. Thus, the retainer 33 is incorporated in the first track ring 34 with the retainer 33 and the projection part 34d elastically deformed.

Figure 23:
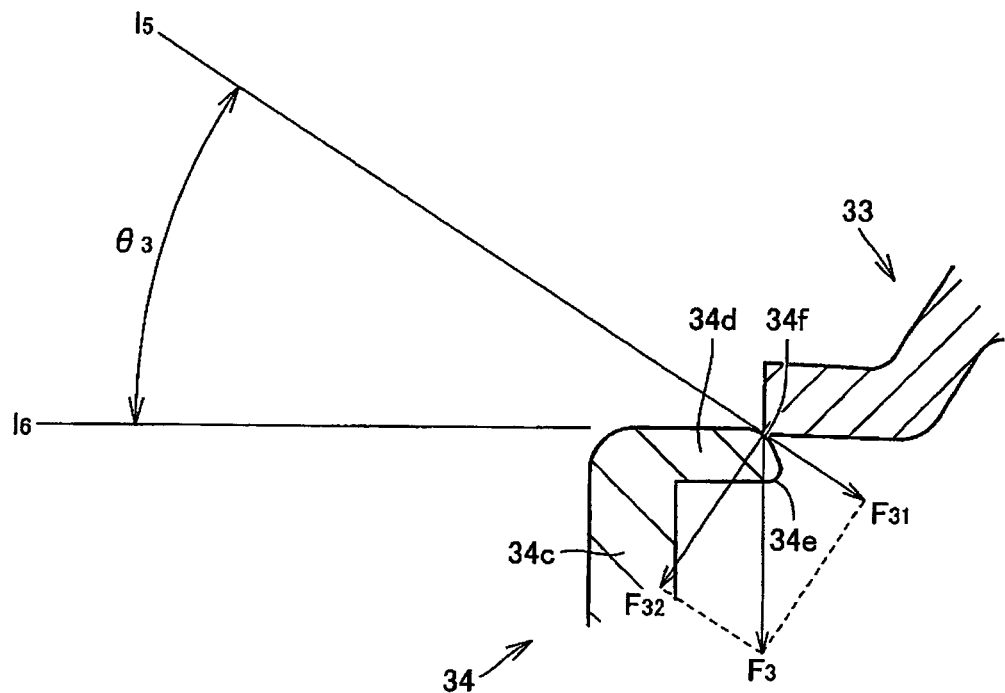
FIG. 23 is an enlarge view showing a part T in FIG. 22.

Referring to FIG. 23, the corner part of the retainer 33 is in contact with the fourth slope part 34f of the projection part 34d in the part T in FIG. 22. Here, the fourth slope part 34f functions as an insertion guide surface when the retainer 33 is incorporated in the first track ring 34, so that the incorporation can be easily implemented.

More specifically, a built-in load $F_3$ acts on the contact part between the outer edge part of the retainer 33 and the fourth slope part 34f in the insertion direction of the retainer 33 (downward in FIG. 23). This built-in load $F_3$ can be decomposed into a component force $F_{31}$ acting in a direction parallel to a tangent line $l_5$ at the contact portion of the retainer 33 with the fourth slope part 34f, and a component force $F_{32}$ acting in a direction perpendicular to the tangent line $l_3$. Thus, when the component force $F_{31}$ exceeds a certain value, the retainer 33 is incorporated in the first track ring 34 through the projection part 34d.

Here, the component force $F_{31}$ is increased in proportion to a contact angle $\theta_3$ formed between the tangent line $l_5$ and a straight line $l_6$ parallel to the surface of the projection part 34d. Thus, when $\theta_3 \geq 45°$, a relation $F_{31} \geq F_{32}$ is provided. Therefore, by adjusting the radial length $B_1$ of the fourth slope part 34f such that the contact angle $\theta_3$ becomes 45° or more, the built-in load $F_3$ can be small when the retainer 33 is incorporated in the first track ring 34.

Next, a method for separating the retainer 33 from the first track ring 34 will be described with reference to FIGS. 24 and 25. In addition, FIG. 24 is a view showing a state when the retainer 33 is separated from the first track ring 34, and FIG. 25 is an enlarged view showing a part U in FIG. 24.

Figure 24:
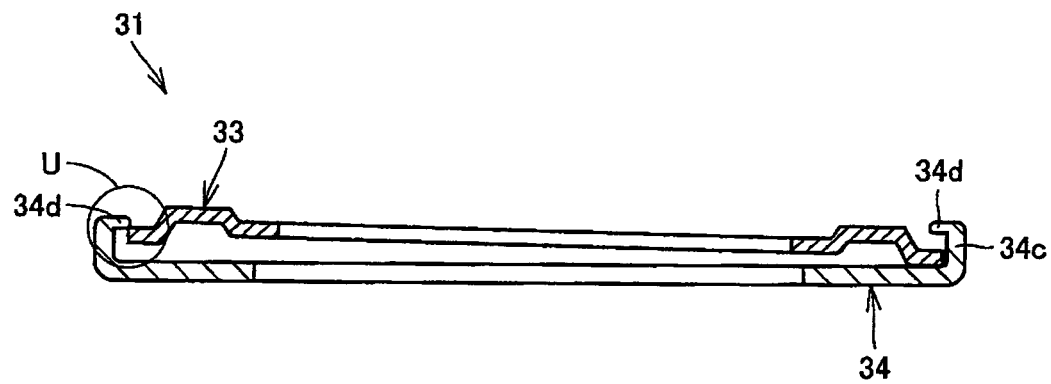
FIG. 24 is a view showing a state when the retainer is separated from the track ring.

First, referring to FIG. 24, when the retainer 33 is separated from the first track ring 34, under the condition that one side (right side in FIG. 24) of the outer edge part of the retainer 33 abuts on the inner diameter surface of the flange part 34c, the other side (left side in FIG. 24) is lifted. At this time, since the outer edge part of the retainer 33 is caught by the projection part 34d, both cannot be separated. Here, when external force is applied to the thrust roller bearing 31, the retainer 33 and the projection part 34d are elastically deformed and both are separated.

Figure 25:
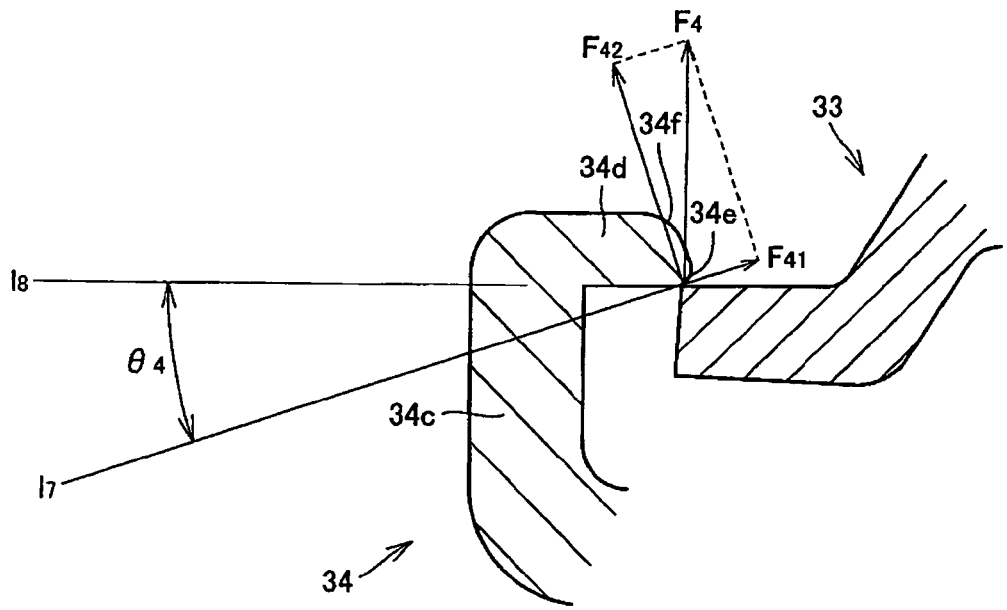
FIG. 25 is an enlarge view showing a part U in FIG. 24.

Referring to FIG. 25, the corner part of the retainer 33 is in contact with the third slope part 34e of the projection part 34d in the part U in FIG. 24. A separation load $F_4$ acts on the contact part between the outer edge part of the retainer 33 and the third slope part 34e in the separation direction of the retainer 33 (upward in FIG. 25). This separation load $F_4$ can be decomposed into a component force $F_{41}$ acting in a direction parallel to a tangent line $l_7$ at the position of the corner part of the retainer 33 with the third slope part 34e, and a component force $F_{42}$ acting in a direction perpendicular to the tangent line $l_7$. Thus, when the component force $F_{41}$ exceeds a certain value, the retainer 33 is separated from the first track ring 34 through the projection part 34d.

Here, the component force $F_{41}$ is increased in proportion to a contact angle $\theta_4$ formed between the tangent line $l_7$ and a straight line $l_8$ parallel to the surface of the projection part 34d. Thus, when $\theta_4 \leq 45°$, a relation $F_{41} \leq F_{42}$ is provided. Therefore, by adjusting the radial length $A_1$ of the third slope part 34e such that the contact angle $\theta_4$ becomes 45° or less, the separation load $F_4$ can be great when the retainer 33 is separated from the first track ring 34.

Figure 26:
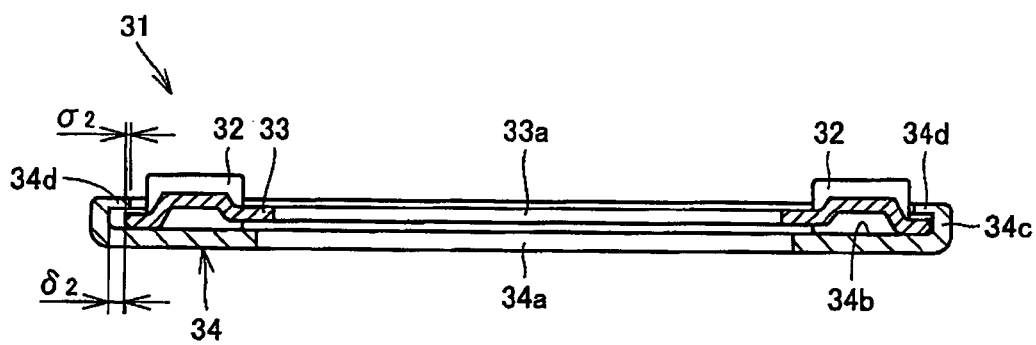
FIG. 26 is a view showing a state in which the retainer is maximally one-sided in a radial direction in the track ring.

Next, a dimensional relation between the retainer 33 and the first track ring 34 will be described with reference to FIG. 26. In addition, FIG. 26 is a view showing a state when the retainer 33 is maximally one-sided in the first track ring 34 in a radial direction. The following description will be similarly applied to a relation between the retainer 33 and the second track ring 35.

First, a minimum overlapping part $\sigma_2$ between the outer edge part of the retainer 33 and the projection part 34d is set such that $-0.1$ mm $\leq \sigma_2 \leq 0.5$ mm. In addition, the minimum overlapping part $\sigma_2$ is calculated by a formula $\sigma_2 = D_3 - (D_4 - t_2)$ wherein $D_3$ represents an outer diameter dimension of the retainer 33, $D_4$ represents an inner diameter dimension of the flange part 34c, and $t_2$ represents an projection amount of the projection part 34d.

When the minimum overlapping part $\sigma_2$ is more than 0.5 mm, the deformation amounts of the retainer 33 and the projection part 34d are increased at the time of assembling, which could cause deformation and damage. Meanwhile, when the minimum overlapping part $\sigma_2$ is less than $-0.1$ mm, it is highly likely that the retainer 33 and the first track ring 34 are separated. Thus, as long as it is within the above range, the separation can be effectively prevented without damaging assembling properties.

In addition, when the minimum overlapping part $\sigma_2$ is $-0.1$ mm, the projection part 34d does not engage with the outer edge part of the retainer 33. However, when the plurality of projection parts 34d are provided on the circumference of the outer periphery flange part 34c as described in the embodiment shown in FIG. 17, the retainer 33 engages with the adjacent projection parts 34d. According to the above constitution, the separation load $F_4$ between the retainer 33 and the first track ring 34 is 30 N or more. As a result, both can be effectively prevented from being separated at the time of transportation, especially at the time of transportation with the track surface 34b kept vertically.

In addition, a radial bearing internal gap $\delta_2$ formed between the outer edge part of the retainer 33 and the flange part 34c is adjusted based on an eccentric amount of a support member. More specifically, it is set to be more than twice the eccentric amount of the support member. Thus, the heat and abrasion that are generated due to the contact between the retainer and the track ring during eccentric rotation can be effectively prevented.

Although the third and fourth slope parts 34e and 34f having the curved surface configuration (R configuration) are formed in the above embodiment, they may have another configuration. For example, another embodiment of the first and second slope parts formed in the projection part will be described with reference to FIG. 27. In addition, since a configuration other than the above is the same as in the above first track ring 34, it will not be reiterated.

Figure 27:
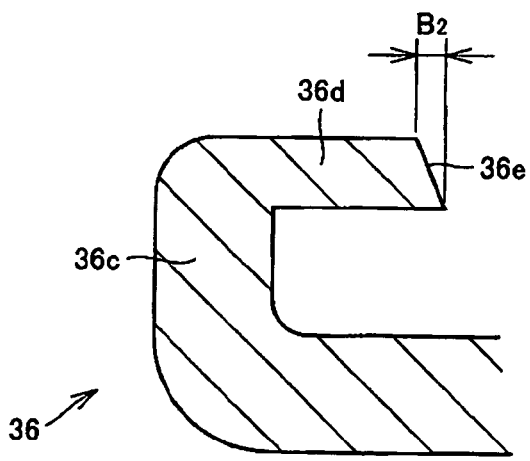
FIG. 27 is a view showing a projection part provided in the track ring according to another embodiment.

Referring to FIG. 27, a slope part 36e is formed at a tip end of a projection part 36d such that a projection amount of the projection part 36d is reduced from a corner part on the side opposed to a track surface 36b toward the opposite side in a thickness direction. When compared with the part in FIG. 14, the third slope part 34e is not provided ($A_2=0$), and the slope part 36e corresponds to the fourth slope part 34f. These slope parts 34e, 34f, and 36e can be formed by chamfering (C chamfering and R chamfering) the corner parts.

In addition, the position and number Of the projection parts 34d can be optionally determined in the first track ring 34 according to the above embodiment. However, when the number of the projection parts 34d is small, the retainer 33 could not be appropriately held. Meanwhile, when the projection parts 34d are provided too many, it becomes difficult to incorporate the retainer 33. In addition, the projection parts 34d are preferably arranged at regular intervals in view of holding the retainer 33 appropriately. This is similarly applied to the stakes 35d formed in the second track ring 35.

In addition, although the thrust roller bearing 31 includes the first track ring 34 having the projection parts 34d, and the second track ring 35 having the stakes 35d in the above embodiment, the thrust roller bearing may have another constitution. For example, the stakes may be formed in the outer periphery flange part of the first track ring, and the projection parts may be formed in the inner periphery flange part of the second track ring. In addition, the projection parts may be formed in the first and second track rings. In addition, each projection part has the first and second slope parts.

Next, a description will be made of a test performed to confirm the effect of the present invention with reference to table 2. According to the effect confirming test, the built-in load and the separation load were measured in three kinds of thrust roller bearings (test bearings 4 to 6) in which the radial dimension $A_1$ of the third slope part 34e, the radial dimension $B_1$ of the fourth slope part 34f, and the minimum overlapping part $\sigma_2$ are set as shown in the table 2. In addition, the incorporation was performed by the method shown in FIGS. 22 and 23, and the separation was performed by the method shown in FIGS. 24 and 25.

TABLE 2

|  | A1 (mm) | B1 (mm) | σ2 (mm) | Built-in load (N) | Separation load (N) |
|---|---|---|---|---|---|
| Test bearing 4 | 0~0.15 | 0~0.15 | 0.1 | 55 | 55 |
| Test bearing 5 | 0.2~0.4 | 0~0.15 | 0.1 | 56 | 29 |
| Test bearing 6 | 0~015 | 0.2~0.4 | 0.1 | 31 | 56 |

Referring to the table 2, the built-in load and the separation load were about the same in the test bearing 4 in which the radial dimensions of the third slope part 34e and the fourth slope part 34f are about the same (A≈B). Meanwhile, the built-in load exceeded the separation load in the test bearing 5 in which $A_1 > B_1$. In addition, the separation load exceeded the built-in load in the test bearing 6 in which $A_1 < B_1$.

As described above, it has been confirmed that the retainer 33 can be incorporated in the track ring 34 more easily as the radial dimension $B_1$ of the fourth slope part 34f is increased. Similarly, it has been confirmed that the retainer 33 is harder to be separated from the first track ring 34 as the radial dimension $A_1$ of the third slope part 34e is decreased. Thus, it has been confirmed that when $A_1 < B_1$, the retainer 33 can be easily incorporated in the first track ring 34, and they are hard to be separated in the thrust roller bearing 31.

In addition, when the retainer 13 having the first and second slope parts 13c and 13d, and the track ring 34 having the third and fourth slope parts 34e and 34f are combined, the built-in load can be further decreased and the separation load can be further increased.

In addition, the present invention can be applied to various kinds of thrust roller bearings having a needle roller, a rod roller, and a cylindrical roller as a roller. Among those, the thrust needle roller bearing is preferable in view of reducing the thickness dimension.

Figure 28:
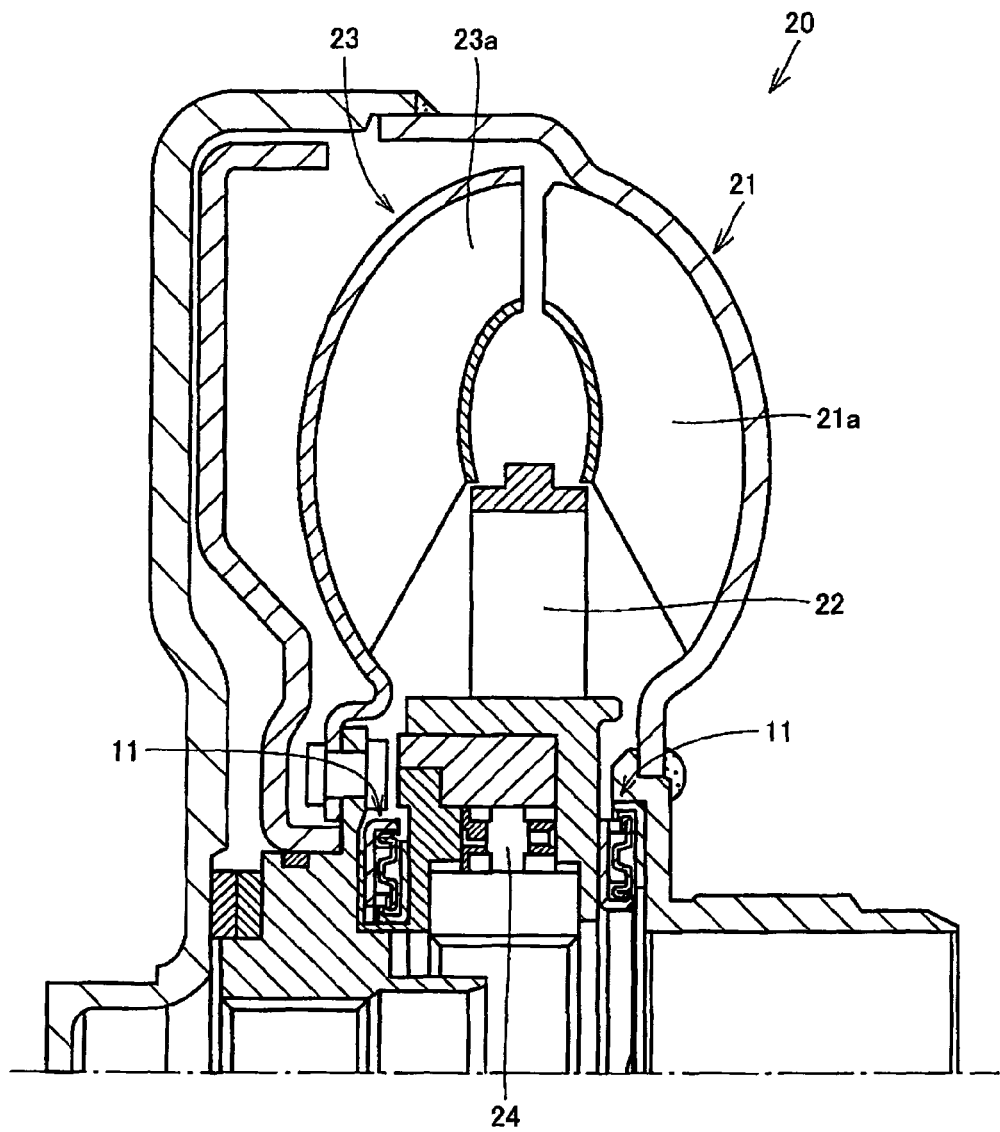
FIG. 28 is a view showing a torque converter according to one embodiment of the present invention.
Figure 29:
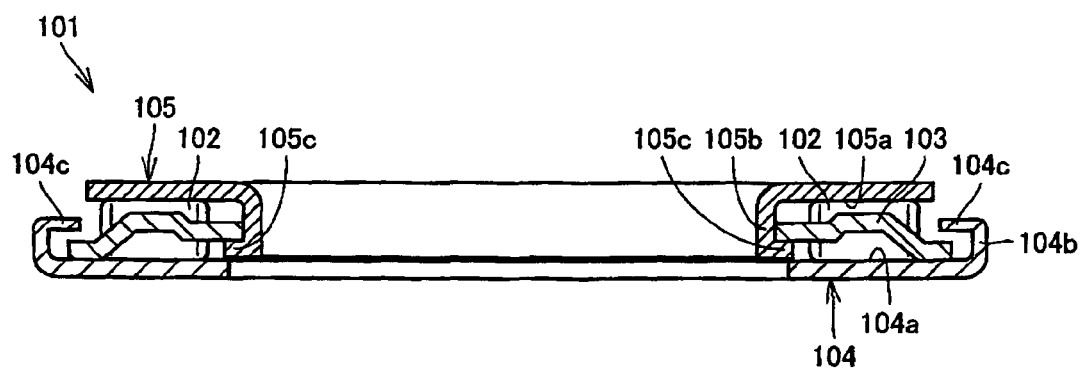
FIG. 29 is a view showing a conventional thrust roller bearing.

Next, a torque converter 20 according to one embodiment of the present invention will be described with reference to FIG. 28. The torque converter 20 is chiefly composed of an impeller 21, a stator 22, and a turbine 23. More specifically, the impeller 21 connected to an output shaft of an engine (not shown) (input shaft seen from the side of the torque converter 20), and the turbine 23 connected to an input shaft of an automatic transmission (not shown) (output shaft seen from the side of the torque converter 20) are arranged so as to be opposed to each other. In addition, the stator 22 is mounted on a stator shaft fixed to a casing through a one-way clutch 24.

The stator 22 orients the fluid circulated between an impeller blade 21a and a turbine blade 23a each formed in the shape of a bowl, from the side of the turbine 23 to the side of the impeller 21, on the inner diameter side thereof. Thus, the direction of the fluid is changed to apply forward rotation force to the impeller 21 and amplify transmission torque.

The above torque converter 20 generates a thrust load when the input shaft or the output shaft rotates. In addition, the impeller 21 and the turbine 23 rotate in an eccentric manner. Thus, the thrust roller bearings 11 according to one embodiment of the present invention as shown in FIG. 2 are arranged between the impeller 21 and the stator 22, and between the stator 22 and the turbine 23.

According to the thrust roller bearing 11, the internal gap $\delta_1$ between the retainer 13 and the first track ring 14 is set to be more than twice the eccentric amount of the impeller 21 and the turbines 23. Thus, the bearing is suitable for supporting the rotation member that rotates in the eccentric manner such as the impeller 21 and the turbine 23. As a result, the torque converter 20 can be high in reliability. In addition, even when the thrust roller bearing 31 is employed instead of the thrust roller bearing 11, the same effect can be achieved.

In addition, although the thrust roller bearing 11 shown in FIG. 2 is incorporated in the torque converter 20 shown in FIG. 18 in the above embodiment, it can be used in another usage, especially in circumstances where the eccentric rotation occurs.

Although the embodiments of the present invention have been described with reference to the drawings in the above, the present invention is not limited to the above-illustrated embodiments. Various kinds of modifications and variations may be added to the illustrated embodiments within the same or equal scope of the present invention.

INDUSTRIAL APPLICABILITY

The present invention can be advantageously applied to a thrust roller bearing used in circumstances where eccentric rotation is generated.

The invention claimed is:
1. A thrust roller bearing comprising:
a plurality of rollers;
a retainer to retain said plurality of rollers;
an annular first track ring having a track surface on which said roller rolls, a cylindrical outer periphery flange part axially extending from an outer periphery end of said track surface, and a first claw part projecting from a tip end of said outer periphery flange part toward the inner diameter side to limit the axial movement of said retainer; and
an annular second track ring having a track surface on which said roller rolls, a cylindrical inner periphery flange part axially extending from an inner periphery end of said track surface, and a second claw part projecting from a tip end of said inner periphery flange part toward the outer diameter side to limit the axial movement of said retainer, wherein
bearing internal gaps to allow the eccentric rotation of said first track ring and said second track ring are provided between said outer periphery flange part and an outer edge part of said retainer, and between said inner periphery flange part and an inner edge part of said retainer,
at least one of said first and second claw parts is a projection part formed by a bending process, and
an edge part of said retainer opposed to said projection part has a first slope part formed at a corner part on the side opposed to said track surface, and a second slope part having a radial length relatively shorter than that of said first slope part, and formed at a corner part on the opposite side in a thickness direction, wherein
an outer edge part of said retainer is folded back toward the radial inner side, and said first and second slope parts are formed at corner parts of said folded back portion.
2. The thrust roller bearing according to claim 1, wherein said first and second slope parts are formed by bending said edge part.
3. The thrust roller bearing according to claim 1, wherein a tip end of said projection part has a third slope part formed at a corner part on the side opposed to said track surface, and a fourth slope part having a radial length relatively longer than said third slope part, and formed at a corner part on the opposite side in the thickness direction.
4. The thrust roller bearing according to claim 1, wherein said first track ring, said second track ring, and said retainer are connected by engagement between said first claw part and said retainer, and by engagement between said second claw part and said retainer, and
a relation $-0.1 \text{ mm} \leq \sigma \leq 0.5 \text{ mm}$ is satisfied wherein $\sigma$ represents a minimum overlapping part between said claw part and said retainer when said retainer is maximally one-sided in the radial direction in said track ring.
5. The thrust roller bearing according to claim 1, wherein said retainer is produced from SPC or SCM as a starting material through a soft nitriding process, a carburizing process, or a nitrocarburizing process as a heat treatment.

6. The thrust roller bearing according to claim 1, wherein said first and second track rings are produced from SPC or SCM as a starting material through a carburizing process or a nitrocarburizing process.

7. The thrust roller bearing according to claim 1, wherein a relation $\theta_1 \geqq 45°$ is satisfied wherein $\theta_1$ represents a contact angle between said first slope part and said projection part when said retainer is incorporated in the track ring having said projection part.

8. The thrust roller bearing according to claim 1, wherein a relation $\theta_2 \leqq 45°$ is satisfied wherein $\theta_2$ represents a contact angle between said second slope part and said projection part when said retainer is separated from the track ring having said projection part.

9. A torque converter comprising:
an impeller connected to an input shaft;
a turbine connected to an output shaft;
a stator to orient operation fluid from said turbine to said impeller; and
the thrust roller bearing according to claim 1 arranged between said turbine and said stator and/or between said impeller and said stator.

10. A thrust roller bearing comprising:
a plurality of rollers;
a retainer to retain said plurality of rollers;
an annular first track ring having a track surface on which said roller rolls, a cylindrical outer periphery flange part axially extending from an outer periphery end of said track surface, and a first claw part projecting from a tip end of said outer periphery flange part toward the inner diameter side to limit the axial movement of said retainer; and an annular second track ring having a track surface on which said roller rolls, a cylindrical inner periphery flange part axially extending from an inner periphery end of said track surface, and a second claw part projecting from a tip end of said inner periphery flange part toward the outer diameter side to limit the axial movement of said retainer, wherein bearing internal gaps to allow the eccentric rotation of said first track ring and said second track ring are provided between said outer periphery flange part and an outer edge part of said retainer, and between said inner periphery flange part and an inner edge part of said retainer, at least one of said first and second claw parts is a projection part formed by a bending process, and an tip end of said projection part has a first slope part formed at a corner part on the side opposed to said track surface, and a second slope part having a radial length relatively longer than a radial length of said first slope part, and formed at a corner part on the opposite side in a thickness direction, wherein an outer edge part of said retainer is folded back toward the radial inner side, and third and fourth slope parts are formed at corner parts of said folded back portion, the third slope formed at the corner part on the side opposed to said track surface, the third slope part having a radial length relatively longer than a radial length of said fourth slope part, which is formed at the corner part on the opposite side in a thickness direction.

* * * * *